(12) United States Patent
Wang

(10) Patent No.: US 7,351,049 B1
(45) Date of Patent: Apr. 1, 2008

(54) CIRCULATING LUBRICATION OIL PASSAGE STRUCTURE OF TOGGLE MECHANISM OF AN INJECTION MOLDING MACHINE

(75) Inventor: Jui-Hsiang Wang, Yung Kang (TW)

(73) Assignee: Hwa Chin Machinery Factory Co., Ltd., Tainan Hsien (TW)

( * ) Notice: Subject to any disclaimer, the term of this patent is extended or adjusted under 35 U.S.C. 154(b) by 63 days.

(21) Appl. No.: 11/517,411

(22) Filed: Sep. 8, 2006

(51) Int. Cl.
*B29C 45/83* (2006.01)

(52) U.S. Cl. ............... 425/107; 164/149; 184/6.19; 425/451.6; 425/593; 100/286

(58) Field of Classification Search ............... 425/107, 425/593, 451.6; 100/286; 164/149; 184/6.19
See application file for complete search history.

(56) References Cited

U.S. PATENT DOCUMENTS 2,306,323 A * 12/1942 Schoepfin et al. .......... 164/314
5,217,662 A * 6/1993 Yamamura et al. ......... 425/107

FOREIGN PATENT DOCUMENTS

| JP | 6-71412 | * | 3/1994 |
| JP | 6-190885 | * | 7/1994 |
| JP | 10-180834 | * | 7/1998 |
| JP | 2000-141436 | * | 5/2000 |
| WO | WO 2005/077639 | * | 8/2005 |

* cited by examiner

*Primary Examiner*—James P. Mackey
(74) *Attorney, Agent, or Firm*—Rosenberg, Klein & Lee

(57) ABSTRACT

A toggle mechanism of an injection molding machine consists of upper and lower toggle assemblies, which are pivoted to a fixed tail support at a first end, and a movable mold support of an injection molding machine at a second end; each of the toggle assemblies has two toggles pivoted together, each of which has pivotal holes on two ends; pivotal rods are passed through corresponding pivotal holes of the toggles to pivot the toggles together; pivotal rods are used to pivot the toggle assemblies to the fixed tail support and the movable mold support; each pivotal rod has oil holes in radial and axial directions; the oil holes communicate with the pivotal holes of the toggles, and each toggle has an internal oil passage communicating with its pivotal holes; lubricating oil will circulate in the toggle mechanism after conduits and filtering barrels are connected to the pivotal rods.

3 Claims, 6 Drawing Sheets

CIRCULATING LUBRICATION OIL PASSAGE STRUCTURE OF TOGGLE MECHANISM OF AN INJECTION MOLDING MACHINE

BACKGROUND OF THE INVENTION

1. Field of the Invention

The present invention relates to a circulating lubrication oil passage structure of a toggle mechanism of an injection molding machine, more particularly one, which allows lubricating oil to circulate in a toggle mechanism consisting of upper and lower toggle assemblies for lubricating the pivotal joints of the toggle mechanism.

2. Brief Description of the Prior Art

Toggle devices are major mechanisms of injection molding machines. A toggle mechanism of an injection molding machine is usually fitted on a fixed support member and a movable mold support of the machine for moving the movable mold support so as to open/close the mold. Referring to FIG. 6, the inventor of the present invention developed an improvement (A) on a toggle mechanism of an injection molding machine once, which comprises a fixed support plate 1, a fixed toggle 10, a moving toggle 20, a pivotal rod 30, sleeves 40, and leakage prevention rings 50; the fixed toggle 10 is fitted on the fixed support plate 1; the moving toggle 20 has a pivotal hole 201, and is pivoted to the fixed toggle 10 by means of the pivotal rod 30; the sleeves 40 are fitted in the pivotal hole 201 of the moving toggle 20 and around the pivotal rod 30, and each have several oil guiding grooves 401 on an inner side, and lubricating oil is received between the pivotal rod 30 and the sleeves 40; furthermore, each of the sleeves 40 has annular recesses 402 on two ends of its inner side; the leakage prevention rings 50 are fitted on the annular recesses 402 for preventing lubricating oil from leaking out of the sleeves 40.

The above structure has a disadvantage: the toggle mechanism takes relatively much time and labor to maintain, and isn't convenient to use; because metal bits and tiny unwanted things will come into existence in the lubricating oil after the toggle mechanism has been used for a certain length of time, the pivotal rod has to be separated from the toggles for oil change regularly otherwise the toggle mechanism won't move smoothly.

SUMMARY OF THE INVENTION

It is a main object of the invention to provide an improvement on a circulating lubrication oil passage structure of a toggle mechanism of a molding machine to overcome the above-mentioned problem. The toggle mechanism of the present invention consists of upper and lower toggle assemblies, which are pivoted to a fixed tail support at a first end, and a movable mold support of an injection molding machine at a second end. Each of the toggle assemblies has two toggles pivoted together, each of which has pivotal holes on two ends thereof; pivotal rods are passed through corresponding pivotal holes of the toggles to pivot the toggles together. And, pivotal rods are used to pivot the toggle assemblies to the fixed tail support and the movable mold support. Each pivotal rod has oil holes in both radial and axial directions; the radial oil holes communicate with the axial oil holes and the pivotal holes of the corresponding toggles. Each toggle has an internal oil passage communicating with its pivotal holes. An oil conduit is connected to the axial oil hole of the pivotal rod on the second end of the upper toggle assembly and that of the pivotal rod on the second end of the lower toggle assembly. And, lubricating oil is injected through the axial oil hole of the pivotal rod on the first end of the upper toggle assembly, and a filtering barrel is connected to the pivotal rod on the first end of the lower toggle assembly.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
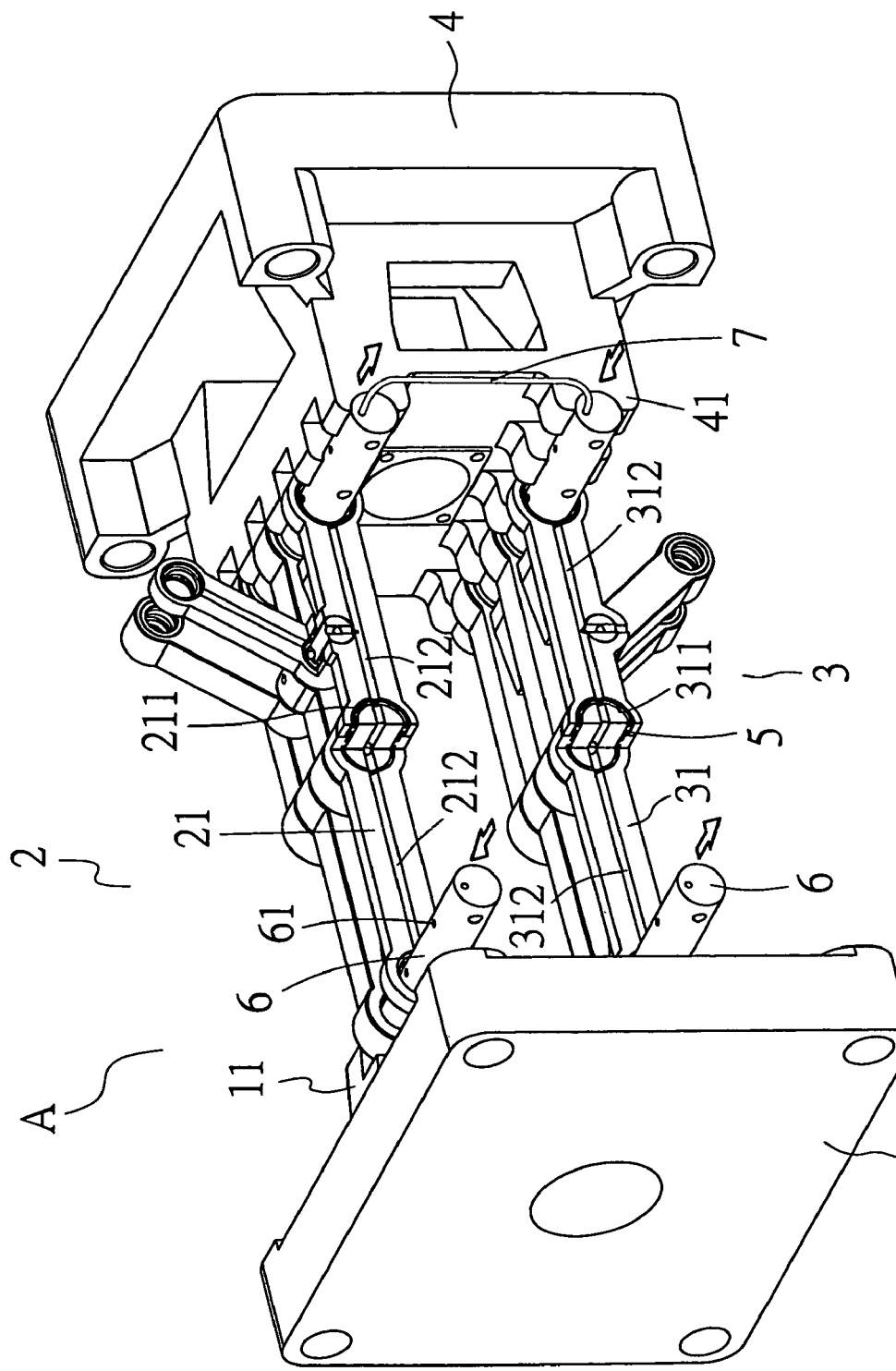
FIG. 1 is a perspective and partial sectional view of the present invention.
Figure 2:
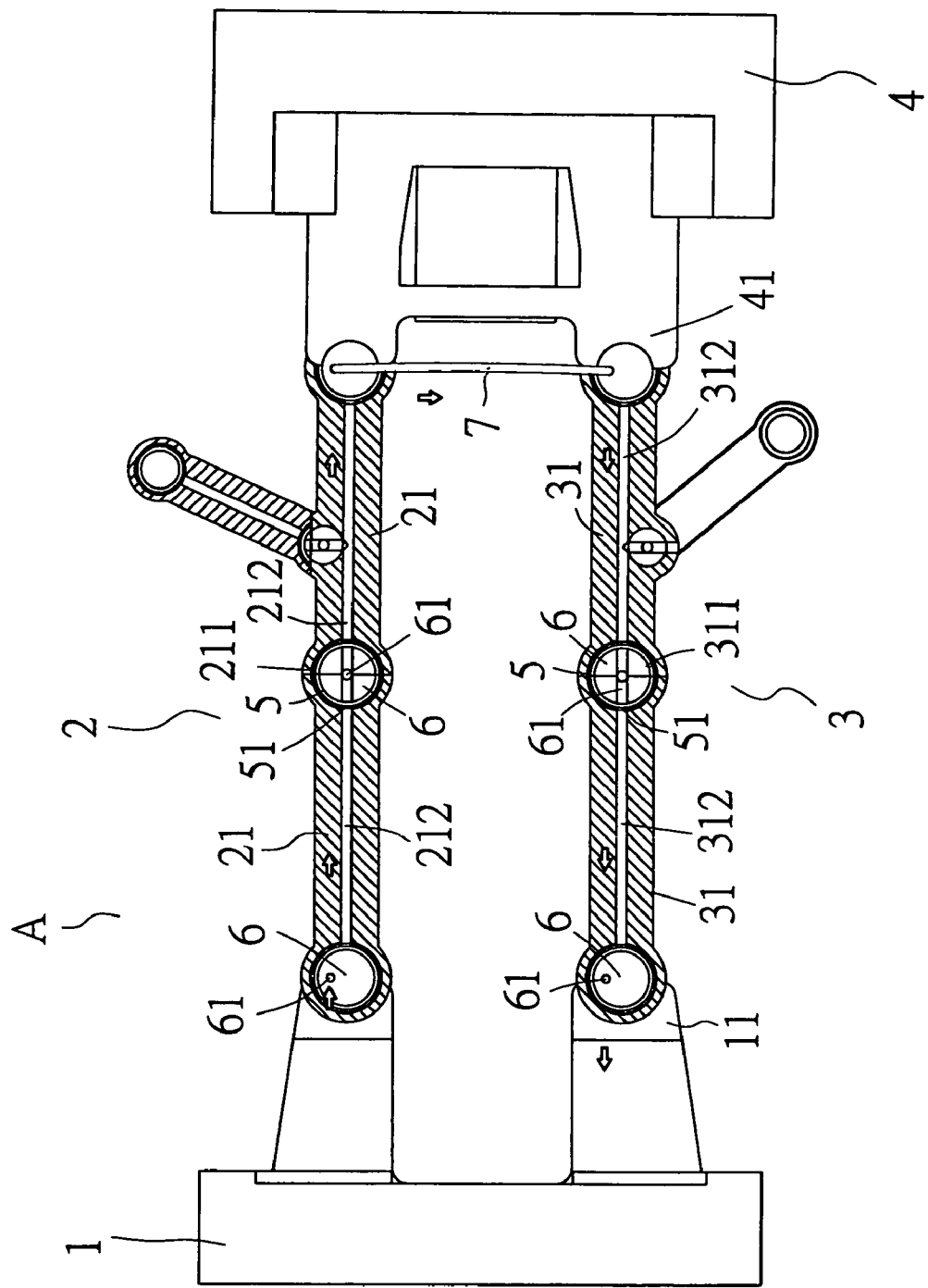
FIG. 2 is a partial sectional view of the present invention.
Figure 3:
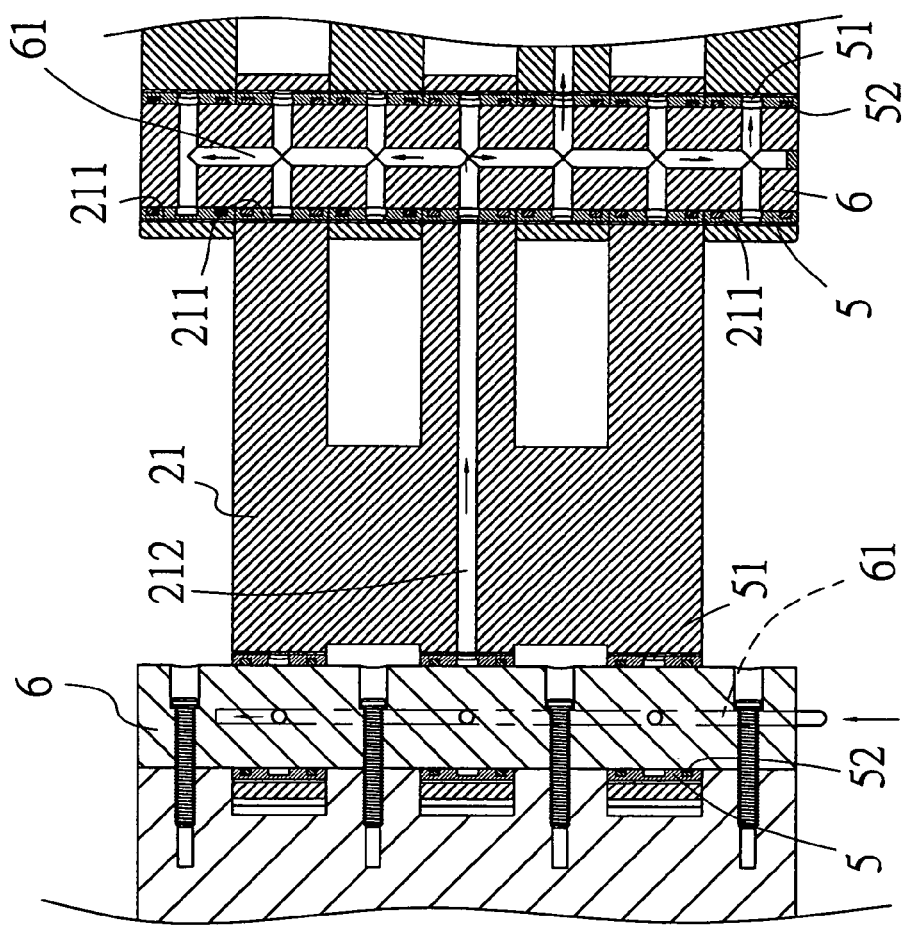
FIG. 3 is a partial sectional view of the present invention (1)
Figure 4:
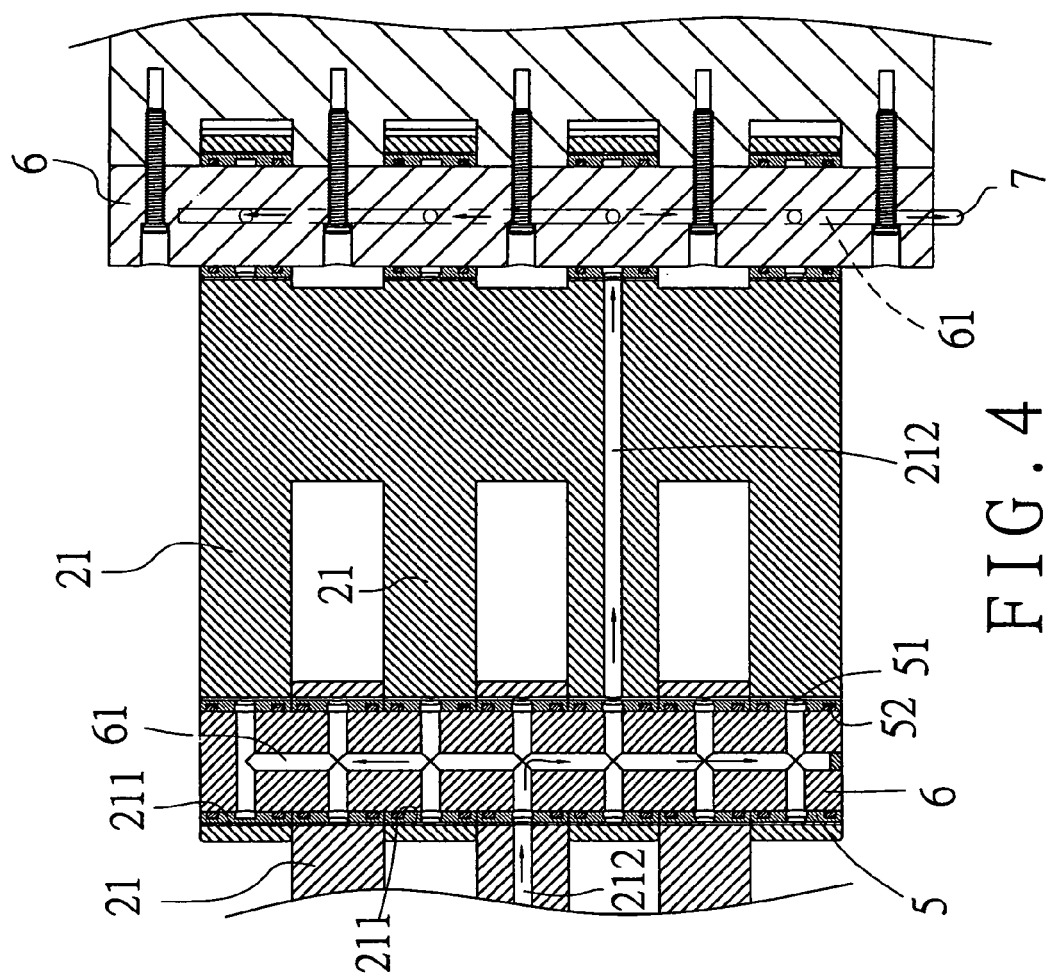
FIG. 4 is a partial sectional view of the present invention (2)

FIGS. 1 and 2 show a first preferred embodiment (A) of an injection molding machine toggle mechanism with a circulating lubrication oil passage. The injection molding machine comprises a fixed tail support 1, the toggle mechanism (A), and a movable mold support 4. The toggle mechanism (A) consists of an upper toggle assembly 2, and a lower toggle assembly 3.

The fixed tail support 1 has fixed pivot members 11 thereon while the movable mold support 4 has fixed pivot members 41 thereon. The upper and the lower toggle assemblies 2 and 3 of the toggle mechanism (A) are pivoted to the fixed pivot members 11 and 41 for moving the movable mold support 4. The upper toggle assembly 2 consists of several toggles 21, each of which has pivotal holes 211 on two ends. The toggles 21 are pivoted together by means of first pivotal rods 6. The upper toggle assembly 2 is pivoted to the corresponding fixed pivot member 11 of the fixed tail support 1 at one end by means of a second pivotal rod 6, and pivoted to the corresponding fixed pivot member 41 of the movable mold support 4 at the other end by means of a third pivotal rod 6.

The lower toggle assembly 3 consists of several toggles 31, each of which has pivotal holes 311 on two ends. The toggles 31 are pivoted together by means of first pivotal rods 6, and sleeves 5 are positioned in the pivotal holes 311 of the toggles 31 and around the first pivotal rods 6. The lower toggle assembly 3 is pivoted to the corresponding fixed pivot member 11 of the fixed tail support 1 at one end by means of a second pivotal rod 6, and pivoted to the corresponding fixed pivot member 41 of the movable mold support 4 at the other end by means of a third pivotal rod 6. Furthermore, sleeves 5 are positioned in the pivotal holes 211, 311 of the toggles 21, 31 and around the pivotal rods 6.

Each of the pivotal rods 6 has oil holes 61 in both the radial and the axial directions; the radial oil holes 61 communicate with the axial oil holes 61 and the pivotal holes 211, 311 of the toggles 21, 31 of the upper and the lower toggle assemblies 2, 3. The toggles 21 of the upper toggle assembly 2 each have a lengthways extending internal oil passage 212 communicating with its pivotal holes 211; thus, the internal oil passages 212 of the toggles 21 communicate with each other. And, the toggles 31 of the lower toggle mechanism 3 each have a lengthways extending internal oil passage 312 communicating with its pivotal holes 311; thus, the internal oil passages 312 communicate with each other. Furthermore, one end of an oil conduit 7 is connected to the third pivotal rod 6 of the upper toggle assembly 2, which is connected to the movable mold support 4, and the other end of the oil conduit 7 is connected to the third pivotal rod 6 of the lower toggle assembly 2, which is connected to the movable mold support 4. Thus, the oil passages 212 and 312 of the upper and the lower toggle assemblies 2 and 3 communicate with each other.

The sleeves 5 of the upper toggle assembly 2 have oil holes 51 facing the oil passages 212 while the sleeves 5 of the lower toggle assembly 3 have oil holes 51 facing the oil passages 312. Furthermore, the sleeves 5 have oil seals 51 thereon for preventing leakage.

Therefore, when lubricating oil is injected into the upper toggle assembly 2 through the axial oil hole 61 of the second pivotal rod 6 of the upper toggle assembly 2, it will travel through the oil passages 212 of the upper toggle assembly 2, the oil holes 61 of the third pivotal rod 6 of the upper toggle assembly 2, the oil conduit 7, the oil holes 61 of the third pivotal rod 6 of the lower toggle assembly 3, and the oil passages 312 of the lower toggle assembly 3 in sequence, and will flow out from the axial oil hole 61 of the second pivotal rod 6 of the lower toggle assembly 3, which second pivotal rod 6 is used to pivot the lower toggle assembly 3 to the fixed tail support 1. Therefore, a circulating oil passage is provided, in which the oil inlet is the second pivotal rod 6 of the upper toggle assembly 2, which is used to pivot the upper toggle assembly 2 to the fixed tail support 1. And, the oil outlet of the circulating oil passage is the second pivotal rod 6 of the lower toggle assembly 3, which is used to pivot the lower toggle assembly 3 to the fixed tail support 1.

Figure 5:
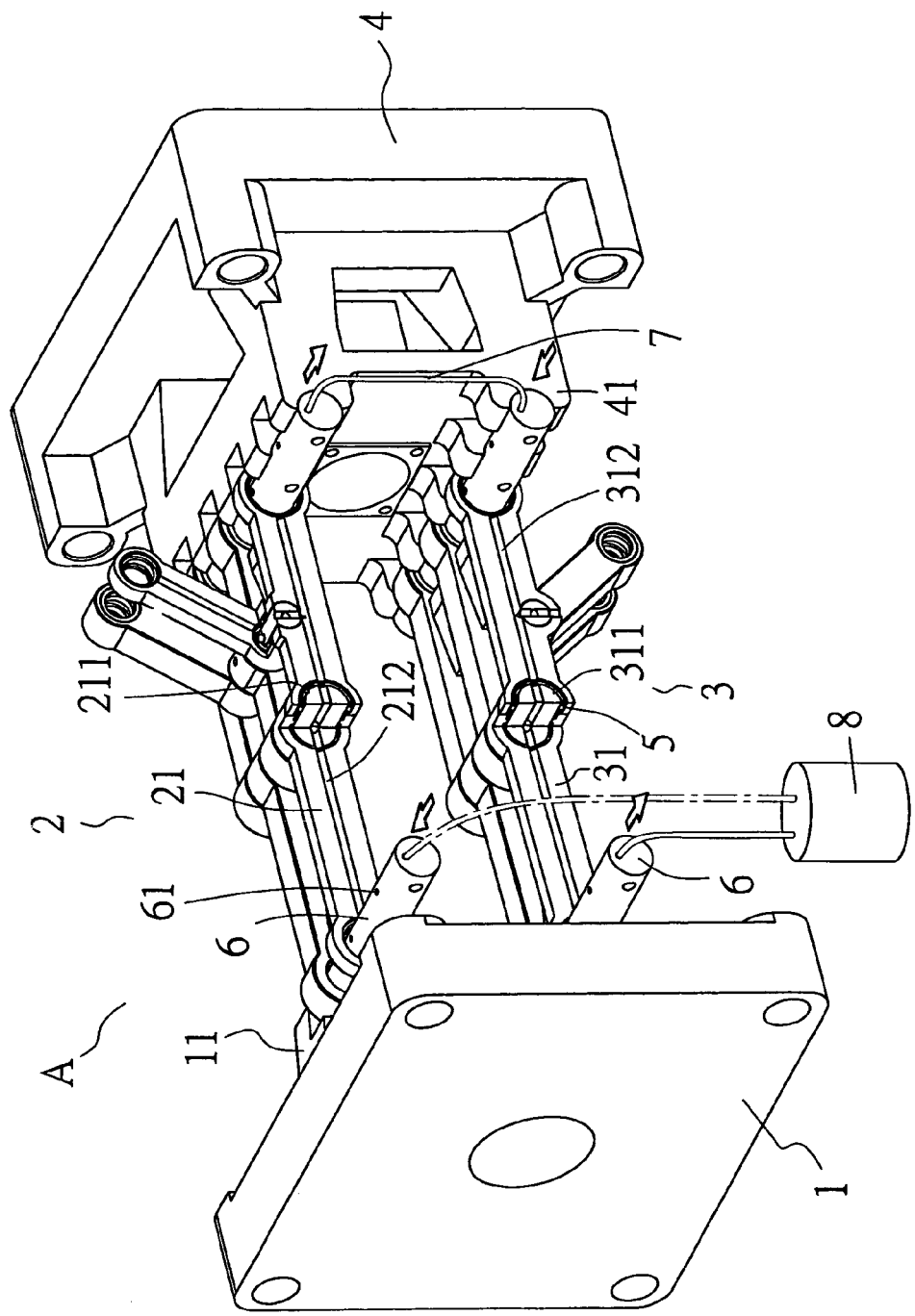
FIG. 5 is a perspective view of the second preferred embodiment of the present invention.
Figure 6:
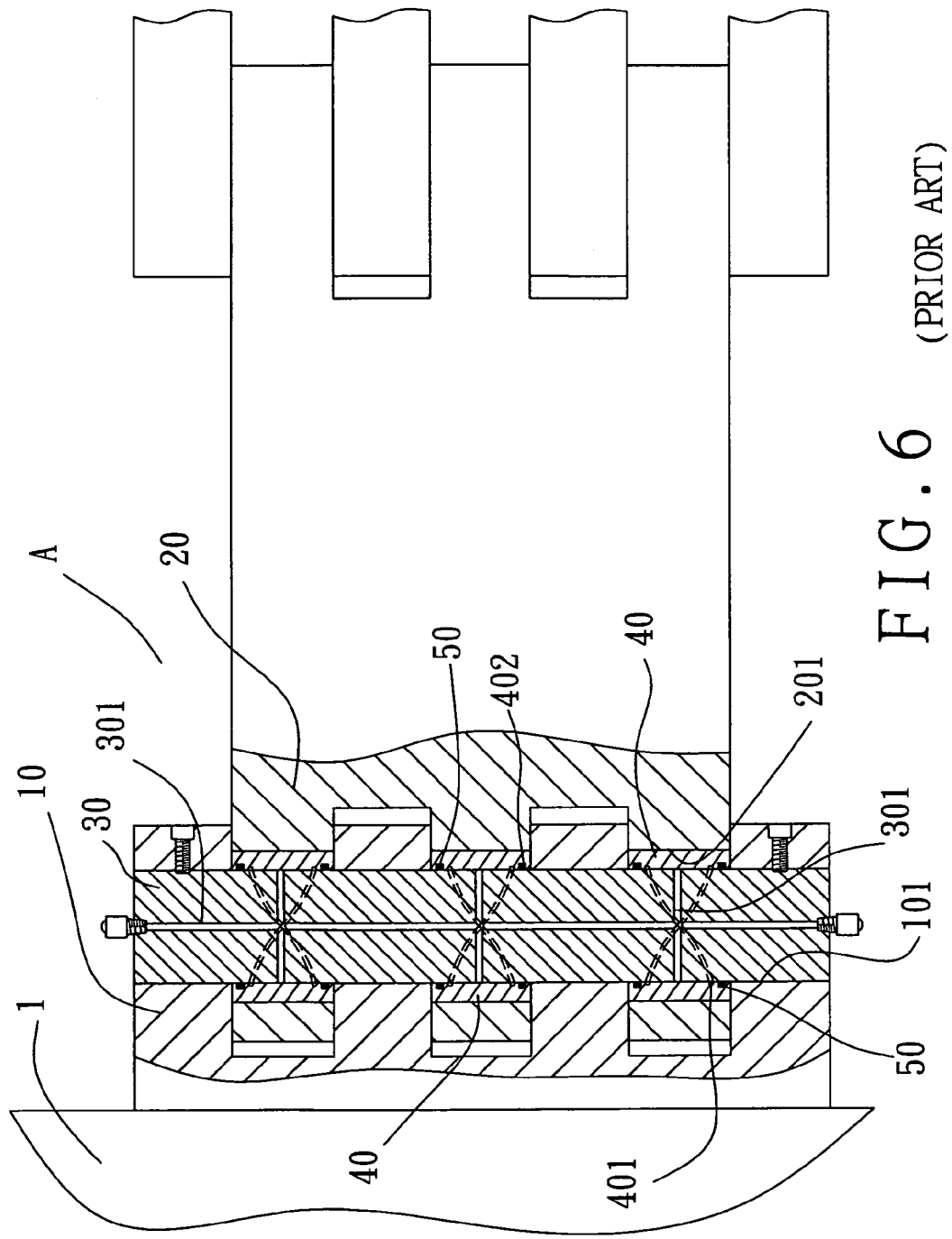
FIG. 6 is a sectional view of the prior art.

Referring to FIG. 5, the above-mentioned circulating lubrication oil passage of the toggle mechanism further has a filtering barrel 8 connected to both the oil inlet and the oil outlet thereof. Therefore, when lubricating oil flows out from the oil outlet, the second pivotal rod 6 of the lower toggle assembly 3, it will travel through the filtering barrel 8 for unwanted things and dirt to be filtered off before it flows back into the upper toggle assembly 2 through the oil inlet.

From the above description, it can be seen that the present invention has an advantage over the above-mentioned currently existing structure: lubricating oil will circulate in the toggle mechanism of the present invention, and unwanted tiny things, e.g. dirt and metal bits, which come into existence owing to movement of the toggles, will be automatically filtered off when the lubricating oil is flowing out of the upper toggle assembly and into the lower toggle assembly, eliminating the need for manual cleaning and saving time and labor.

What is claimed is:

1. Circulating lubrication oil passage structure of a toggle mechanism of an injection molding machine, said toggle mechanism consisting of:

(a) an upper toggle assembly, the upper toggle assembly being pivoted to a fixed tail support of an injection molding machine at a first end, and a movable mold support of the injection molding machine at a second end; the upper toggle assembly having:

a plurality of toggles pivoted together, each of the toggles having pivotal holes on two ends thereof;

first pivotal rods passed through corresponding pivotal holes of the toggles to pivot the toggles together;

a second pivotal rod passed through one said pivotal hole and connected to the fixed tail support of the injection molding machine so as to pivot the upper toggle assembly to the fixed tail support;

a third pivotal rod passed through one said pivotal hole and connected to the movable mold support of the injection molding machine so as to pivot the upper toggle assembly to the movable mold support;

each of the pivotal rods having oil holes in both radial and axial directions, which communicate with each other; the radial oil holes communicating with the axial oil holes and the pivotal holes of the toggles; each of the toggles having an internal oil passage communicating with both the pivotal holes thereof;

sleeves positioned in the pivotal holes of the toggles and around the pivotal rods, the sleeves having a plurality of oil holes thereon, which communicates with the internal oil passages of the toggles;

(b) a lower toggle assembly, the lower toggle assembly being pivoted to the fixed tail support at a first end, and the movable mold support at a second end thereof; the lower toggle assembly having:

a plurality of toggles pivoted together, each of the toggles having pivotal holes on two ends thereof;

first pivotal rods passed through corresponding pivotal holes of the toggles to pivot the toggles together;

a second pivotal rod passed through one said pivotal hole and connected to the fixed tail support so as to pivot the lower toggle assembly to the fixed tail support;

a third pivotal rod passed through one said pivotal hole and connected to the movable mold support so as to pivot the lower toggle assembly to the movable mold support;

each of the pivotal rods having oil holes in both radial and axial directions; the radial oil holes communicating with the axial oil holes and the pivotal holes of the toggles; each of the toggles having an internal oil passage communicating with both the pivotal holes;

sleeves positioned in the pivotal holes of the toggles and around the pivotal rods, the sleeves having a plurality of oil holes thereon, which communicates with the internal oil passages of the toggles; and (c) an oil conduit, the oil conduit being connected to the oil holes of the third pivotal rods of the upper and the lower toggle assemblies at two ends thereof;

the second pivotal rod of the upper toggle assembly being used as a lubricating oil inlet of the circulating lubrication oil passage; the second pivotal rod of the lower toggle assembly being used as a lubricating oil outlet.

2. The circulating lubrication oil passage structure of a toggle mechanism of an injection molding machine as recited in claim 1, wherein each of the sleeves has a plurality of oil seals fitted thereto for preventing leakage of lubricating oil.

3. The circulating lubrication oil passage structure of a toggle mechanism of an injection molding machine as recited in claim 1 further having a filtering barrel connected to the oil outlet; thus, unwanted things will be filtered off before the lubricating oil flows through the oil inlet of the circulating lubrication oil passage.

* * * * *